US012558795B2

(12) United States Patent　(10) Patent No.: US 12,558,795 B2
Jamali et al.　(45) Date of Patent:　Feb. 24, 2026

(54) SYSTEMS AND METHODS FOR TAXEL HYPER-RESOLUTION THROUGH MULTI-CONTACT LOCALIZATION

(71) Applicant: Honda Motor Co., Ltd., Tokyo (JP)

(72) Inventors: Nawid Jamali, San Francisco, CA (US); Hongyu Li, Providence, RI (US); Soshi Iba, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 18/517,649

(22) Filed: Nov. 22, 2023

(65) Prior Publication Data

US 2025/0162169 A1　May 22, 2025

(51) Int. Cl.
B25J 13/08　(2006.01)
(52) U.S. Cl.
CPC ................................... B25J 13/084 (2013.01)
(58) Field of Classification Search
CPC .................. B25J 13/084; G01L 5/228; G05B 2219/40575; G05B 2219/40625
See application file for complete search history.

(56) References Cited

U.S. PATENT DOCUMENTS

2021/0270605 A1* 9/2021 Patel .......................... G06T 7/40
2022/0080598 A1* 3/2022 Jamali .................... B25J 13/084
2022/0084241 A1* 3/2022 Dikhale ................. B25J 9/1694
2023/0234232 A1* 7/2023 Hayashi ................. B25J 13/084
　　　　　　　　　　　　　　　　　　　　700/253
2025/0137859 A1* 5/2025 Li ........................... G01L 5/228

OTHER PUBLICATIONS

Wu, Bing, Qian Liu, and Qiang Zhang. "Tactile pattern super resolution with taxel-based sensors." 2022 IEEE/RSJ International Conference on Intelligent Robots and Systems (IROS). IEEE, 2022. (Year: 2022).*
Wu, et al., Tactile Pattern Super Resolution with Taxel-based Sensors, Institute of Electrical and Electronics Engineers, (2022) pp. 3644-3650.
Caddeo, et al., Collision-aware In-hand 6D Object Pose Estimation using Multiple Vision-based Tactile Sensors, Institute of Electrical and Electronics Engineers, (2023) pp. 719-725.
Radford, et al., Learning Transferable Visual Models From Natural Language Supervision, Proceedings on Machine Learning, vol. 139, (2021) pp. 1-16.
Grill, et al., Bootstrap Your Own Latent A New Approach to Self-Supervised Learning, 34th Conference on Neural Information Processing Systems, (2020) pp. 1-14.
Paton, An Algorithm for Finding a Fundamental Set of Cycles of a Graph, Commununications of the ACM, vol. 12, No. 9, (1969) pp. 514-518.

* cited by examiner

*Primary Examiner* — Dale Moyer
(74) *Attorney, Agent, or Firm* — Rankin, Hill & Clark LLP

(57) ABSTRACT

Systems and methods for taxel hyper-resolution output are provided. Tactile sensors contact an object and produce taxel data for each contact made. Taxel data from the tactile sensors is encoded and compared with detailed geometric data of a known object to generate a set of ranked poses. For each pose one or more substantially matching candidate poses from the stored geometric data are generated. Pairs of poses are iteratively compared with pairs of candidate poses to determine the most probable candidate pose for each pose. Taxel hyper-resolution data for determined poses is generated from the detailed geometric data and output for use by downstream systems.

20 Claims, 7 Drawing Sheets

400

402

Add nodes to graph for each candidate pose

404

Add edges to graph based on pairwise comparison of filtered poses and associated candidate poses

406

Use cycle algorithm to determine highest probability candidate poses for filtered poses

408

Generate taxel hyper-resolution output for filtered poses

600

602

604 COMPUTER INSTRUCTIONS 606 01011010001010
10101011010101
101101011100...

608 COMPUTER READABLE MEDIUM

SYSTEMS AND METHODS FOR TAXEL HYPER-RESOLUTION THROUGH MULTI-CONTACT LOCALIZATION

BACKGROUND

Tactile sensors generate tactile sensor data when contacting objects in their environment. Tactile sensor data may be analyzed to determine geometric information of an object touched by one or more tactile sensors. A taxel-based tactile sensor may be characterized by the number of tactile pixels, or taxels, and the types of tactile sensor data it provides. Many commercially available taxel-based tactile sensors have low spatial resolution of one to several taxels. When in contact with an object, not all of the taxels of the taxel-based tactile sensors may be activated. The low spatial resolution of taxel-based tactile sensors may make it difficult to sense and determine detailed geometric information about an object's surfaces solely from physically contact by the taxel-based tactile sensors alone.

BRIEF DESCRIPTION

According to one embodiment, a system for taxel hyper-resolution output through multi-contact localization is provided. The system includes a first processing module, a second processing module, and an output module. The first processing module encodes the taxel data received from one or more tactile sensors that touch an object of interest. The tactile sensors may touch the object one or more times and may move between touches. The encoded taxel data is compared with pre-derived detailed geometric data about the object. A set of poses is generated based on the comparison. The poses may be ranked and filtered to include only the poses that best match the stored data. For each pose, one or multiple candidate poses from the stored data are selected for processing. The second processing module performs pairwise comparisons of pairs of poses with pairs of candidate poses to determine substantially matching pairs. The comparisons are performed iteratively so that all possible poses are compared. The candidate poses may be stored in a graph and cycling algorithms may be utilized to iteratively process the candidate poses. Based on the iterative comparisons, the most probable candidate pose for each of the poses is determined. The output modules generates taxel hyper-resolution data from the stored object data for one or more of the determined poses. The output data may be suitably formatted for a downstream system.

According to another embodiment, a method for taxel hyper-resolution output through multi-contact localization is provided. The method includes receiving taxel-based data associated with one or more contacts with an object by one or more tactile sensors. The taxel-based data is compared with stored detailed object data and a set of poses is generated, which may be ranked and filtered to include only a subset of matching poses. One or more candidate poses from the detailed object data are determined, and iterative pairwise comparisons of pairs of poses with pairs of candidate poses are performed. The candidate poses may be stored as nodes in a sparse multipartite graph and a cycling algorithm may be used to determine the most probable candidate pose for each pose. Detailed taxel hyper-resolution data for each determined pose may be generated and output to a downstream system in a suitable format.

According to yet another embodiment, a non-transitory computer readable storage medium is provided. The non-transitory computer readable medium may store instructions that, when executed by a computer having a processor, cause the computer to perform a method for outputting taxel hyper-resolution data. The method includes receiving taxel data associated with one or more tactile sensors that contact an object one or more times. The taxel data is compared with detailed object data, and a set of poses is generated from the taxel data based at least in part on the comparing operation. The set of poses may be ranked and filtered to include only a subset of the poses that best match the detailed object data. One or more candidate poses for each of the poses in the set of poses is generated from the detailed object data based at least in part on comparing taxel data associated with a pose with the detailed object data. A substantially matching candidate pose for each pose may be determined by performing iterative pairwise comparisons of pairs of poses with pairs of candidate poses. Nodes representing each of the candidate poses may be added to a multipartite graph, along with edges representing pairs of candidate poses that substantially match pairs of poses, to allow cycling algorithms to efficiently determine candidate poses that are the highest probable match with the set of poses. Taxel hyper-resolution data for the determined poses is generated from the detailed object data and output in a suitable format to a downstream system.

DETAILED DESCRIPTION

Figure 1:
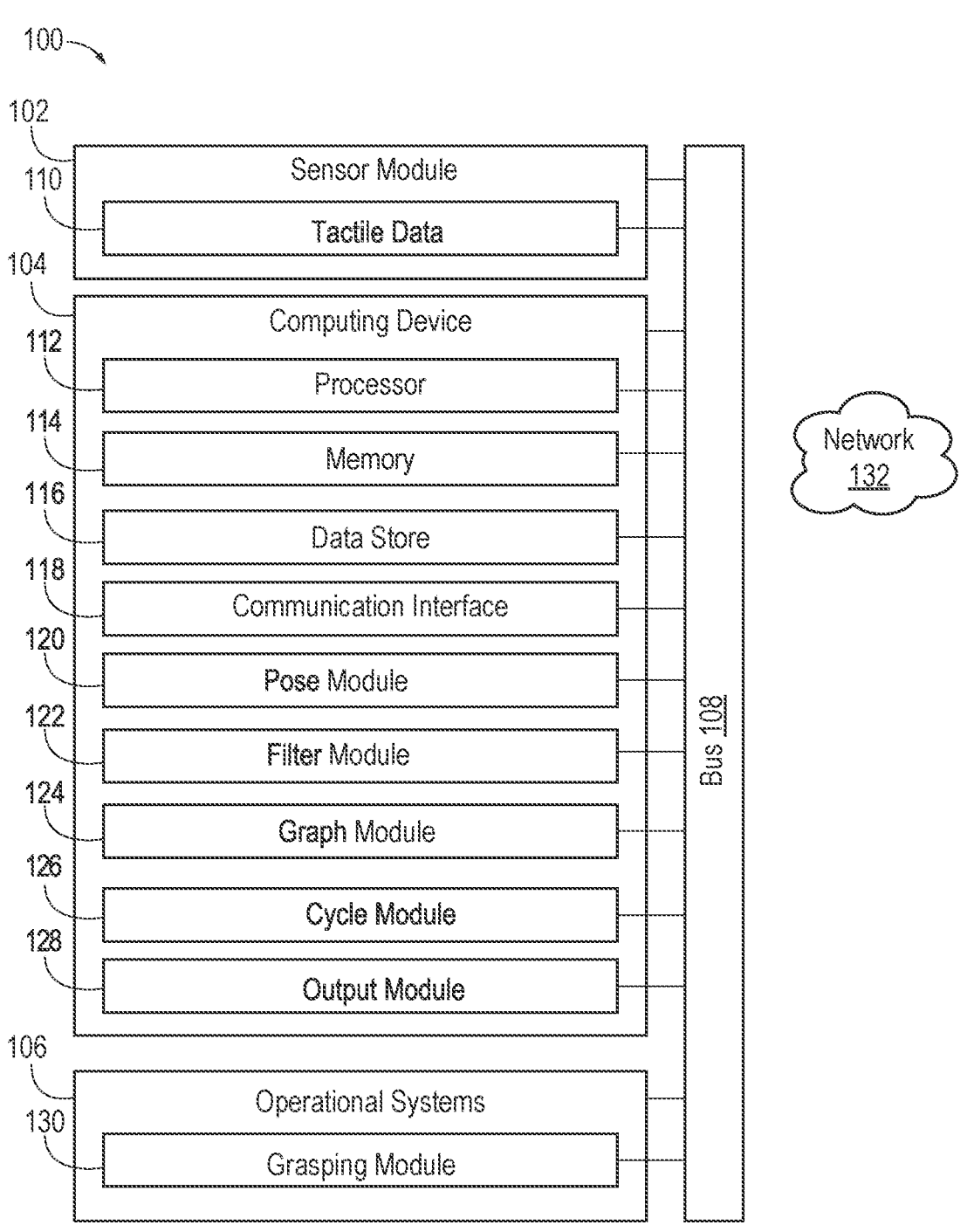
FIG. 1 is an exemplary component diagram of a system for generating hyper-resolution geometric output data of an object from multi-contact low resolution taxel data, according to one aspect.

The systems and methods herein for generating hyper-resolution geometric output data from low resolution taxel data provide an agent the ability to output detailed geometric data of an object given sparse taxel data from multiple contacts by low resolution tactile sensors. This detailed geometric data about an object may be used, for example, by a downstream system to determine a suitable contact location for a stable grasp of the object by a robotic system.

To determine an object's physical geometry, an agent typically makes multiple contacts with an object to generate sufficient tactile data to ascertain the geometry of the object.

However, performing multiple contact operations may be time consuming for the agent and inefficient for optimal functioning of a downstream system relying on timely delivery of detailed geometric data. Multiple contact attempts are not only time consuming but also may increase the possibility of directly causing damage to the object, while fewer contact attempts may lead to potential errors in the determined geometric data. It is advantageous to minimize the number of contacts necessary to determine the geometry of an object while providing high resolution geometric information about the object to a downstream system.

Here, the systems and methods may output hyper resolution taxel data associated with tactile sensor contacts with an object based on sparse taxel data received from low resolution tactile sensors. In one embodiment, the system may receive taxel data from one or more tactile sensors that contact an object one or more times. The taxel data may be filtered by comparing processed taxel data from the sensors with pre-derived taxel data of a known object to determine candidate poses. Candidate poses may be iteratively paired with other candidate poses to determine distances between poses. Poses and distances may be iteratively compared to corresponding pre-derived candidate poses and distances of a known object to determine the most likely position and orientation of the contacted object. High resolution geometric data of the known object may be output based by applying a suitable transformation to the stored geometric data about the object based on the determined position and orientation of the contacted object.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled machine that moves through or manipulates an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area Network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more users and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more users. Further, the term "vehicle" may include vehicles that are automated or non-automated with pre-determined paths or free-moving vehicles.

I. System Overview

The drawings are for purposes of illustrating one or more exemplary embodiments and not for purposes of limiting the same. FIG. 1 is an exemplary component diagram of an operating environment 100 for providing taxel hyper-resolution output, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device may be implemented as a part of an agent. The agent may be a robotic arm, a bipedal robot, a two-wheeled or four-wheeled robot, a vehicle, a self-propelled machine, or a part of an assembly line. The agent may be configured as a humanoid robot. The humanoid robot may take the form of all or a portion of a robot. For example, the humanoid robot may take the form of an arm coupled to a hand with fingers. The computing device 104 may be implemented as part of a telematics unit, a head unit, a navigation unit, an infotainment unit, an electronic control unit, among others of an ego agent. In other embodiments, the components and functions of the computing device 104 may be implemented, for example, with other devices (e.g., a portable device) or another device connected via a network (e.g., a network 132). The computing device 104 may be capable of providing wired or wireless computer communications utilizing various protocols to send/receive electronic signals internally to/from components of the operating environment 100. Additionally, the computing device 104 may be operably connected for internal computer communications via the bus 108 (e.g., a Controller Area Network (CAN) or a Local Interconnect Network (LIN) protocol bus) to facilitate data input and output between the computing device 104 and the components of the operating environment 100.

The computing device 104 receives tactile data 110 from the sensor module 102. These data signals may be converted into other data formats (e.g., numerical) and/or used by the sensor module 102, the computing device 104, and/or the operational systems 106 to generate other data metrics and parameters. Sensors may be any type of sensor, for example, acoustic, electric, environmental, optical, imaging, light, pressure, force, thermal, temperature, proximity, gyroscope, and accelerometers, among others. Furthermore, a single sensor may include multiple individual sensors and/or sensing components, for example as illustrated by the tactile sensors 206 of FIG. 2.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources, which will be described herein. Additionally, the computing device 104 also includes a pose module 120, a filter module 122, a graph module 124, a cycle module 126, and an output module 128 for generating and outputting taxel hyper-resolution output.

One or more of the pose module 120, the filter module 122, the graph module 124, the cycle module 126, and the output module 128 may be implemented in part or in whole using one or more neural networks that implement machine learning which may include deep learning. Example neural networks include convolution neural networks (CNN) and conditional generative adversarial networks (cGAN). Components of a neural network may include an input layer, an output layer, and one or more hidden layers, which may be convolutional filters.

The computing device 104 is also operably connected for computer communication (e.g., via the bus 108 and/or the communication interface 118) to one or more operational systems 106. The operational systems 106 may include, but are not limited to, any automatic or manual systems that may be used to enhance the agent and/or operation. The operational systems 106 may be dependent on the implementation. For example, the operational systems 106 may include a grasping module 130. As an example, the grasping module 130 monitors, analyzes, and calculates grasp information and facilitates features like a determination of how to initially move to an object and then proceed to contact the object one or more times. For example, the grasping module 130 operates the movable members 204 via the agent 202 of FIG. 2 to position the tactile sensors 206 proximate to an object 210 and grasps the object 210 to generate tactile data 212.

The operational systems 106 also include and/or are operably connected for computer communication to the sensor module 102. For example, one or more sensors of the sensor module 102 may be incorporated with the grasping module 130 to monitor characteristics of the environment or the agent.

The sensor module 102, the computing device 104, and/or the operational systems 106 are also operatively connected for computer communication to the network 132. The network 132 is, for example, a data network, the Internet, a wide area network (WAN) or a local area (LAN) network. The network 132 serves as a communication medium to various remote devices (e.g., databases, web servers, remote servers, application servers, intermediary servers, client machines, other portable devices). Using the system and network configuration discussed above, anomalous events may be detected. Detailed embodiments describing exemplary methods using the system and network configuration discussed above will now be discussed in detail.

Figure 2:
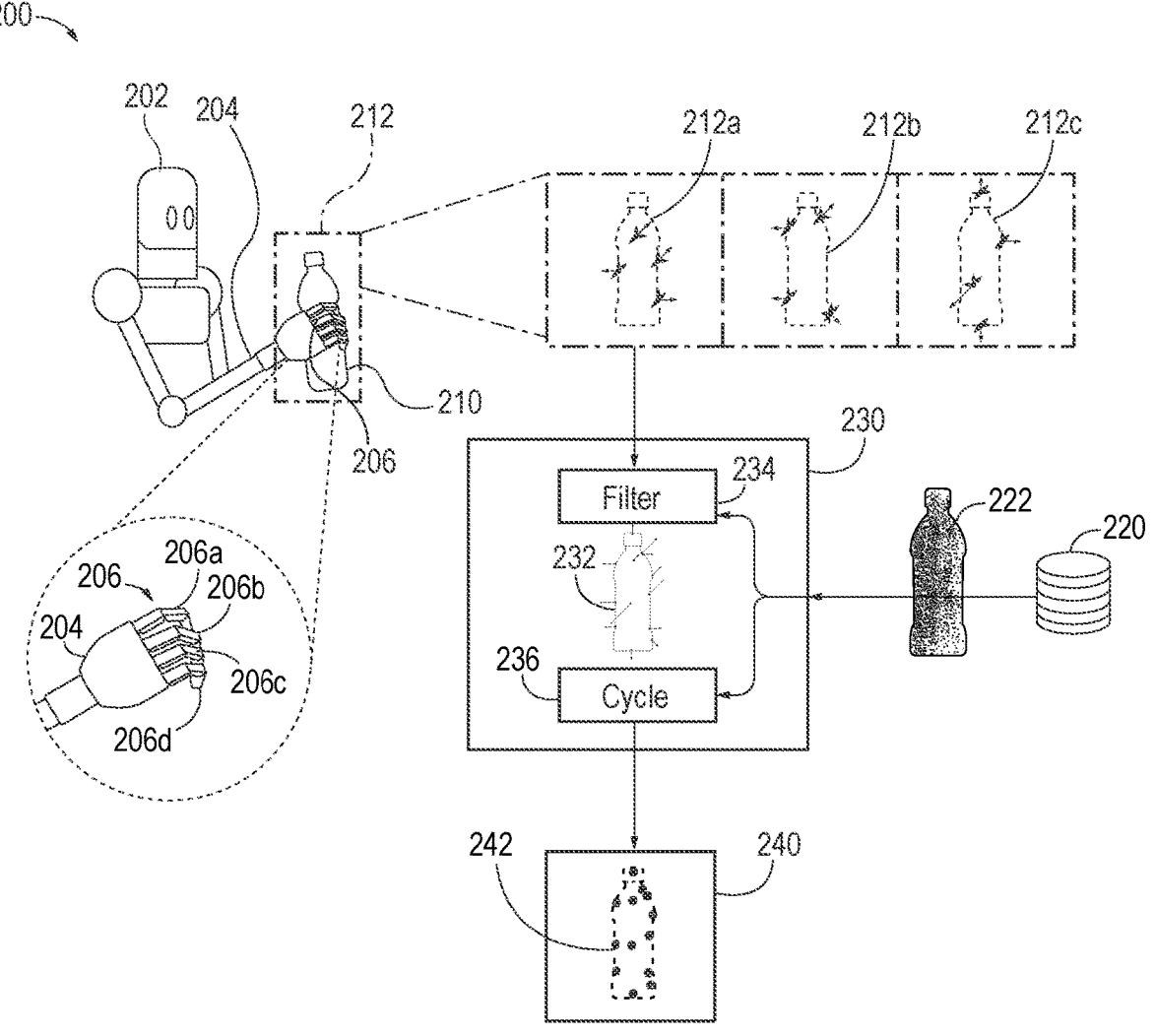
FIG. 2 is an exemplary process flow of a method for generating hyper-resolution geometric output data of an object from low resolution taxel data, according to one aspect.

Referring also to FIG. 2, a system 200 for taxel hyper-resolution output is presented. The system 200 achieves taxel hyper-resolution output from sparse taxel inputs through multi-contact localization as described below. The system 200 may include an agent 202. The agent may have one or more movable members 204, such as an arm and fingers as illustrated. The distal portion of the movable members 204 may include one or more sensors 206. In an exemplary embodiment, the sensors 206 may include four taxel sensors illustrated as tactile sensors 206a, 206b, 206c, and 206d. Each tactile sensor 206 may further include one or multiple individual sensing elements. Each tactile sensor 206 may be configured to sense pressure, directionality, etc. depending on the particular characteristics of each sensor 206. For example, a tactile sensor 206 may be configured in an array of four-by-four taxels that provide tactile sensor data such as pressure and other data that may be used to determine the angle of incidence of the pressure.

The tactile sensor 206 may include tensile force sensors, compression force sensors, tensile and force compression sensors, or other measurement components. The movable member 204 may be a Weiss gripper with tactile sensors 206 being GelSight tactile sensors. In some embodiments, the tactile sensor data 212 is augmented as additional sensor data from other sources is received. For example, the tactile sensor data 212 from the tactile sensor 206 may be augmented by other sources, such as additional force sensors (e.g., from a second hand of the agent 202), and/or remote devices (e.g., via the bus 108 and/or the communication interface 118).

In an embodiment, movable members 204 may be configured to position the one or more sensors 206 proximate to the object 210 and contact the object 210 with one or more of the sensors 206. The agent 202 may cause the movable members 204 to move to a new position between each contact or to remain relatively stationary between contacts. The sensor module 102 of FIG. 1 may receive information associated with the agent 202, the movable members 204, the sensors 206, and the object 210. The operational systems 106 of FIG. 1 may transmit control information to the agent 202 and movable members 204 via the grasping module 130.

In an embodiment, the agent 202 may make contact with the object 210 at a random location on the object 210 to collect tactile sensor data 212. In some embodiments, the agent 202 may make contact with the object 210 a predetermined number of times. For example, the agent may select a random location (x, y, z, θ) to sample the surface of the object 210. The contact force of the tactile sensor 206 may be set to a constant value or any other suitable value. In another embodiment, the agent 202 may make multiple contacts with the object 210 until a predetermined amount of tactile sensor data 212 is received.

In a related embodiment, contacts with the object 210 may be repeated until a desired level of confidence in the poses has been attained. In this embodiment, repeated contacts may be performed concurrent with part or all of the methods described below with regard to FIG. 3 and FIG. 4 until a desired confidence level is attained. For example, the pre-processing algorithm 234 and processing algorithm 236 may be performed after each contact, or after a number of contacts have been performed, and the agent 202 may continue making new contacts with the object 210 until there are sufficient data to accurately determine the poses to within a desired degree of certainty.

During each contact with an object 210, the sensors 206 generate tactile sensor data 212 from the contact with the object 210. For example, as illustrated in FIG. 2, the movable member 204 is repositioned after each contact with the object 210 generating tactile sensor data 212a, 212b, and 212c. The tactile sensor data 212 is received by a processing network 230 which in an embodiment is the computing device 104 of FIG. 1.

The processing network 230 may include a pre-processing algorithm 234 configured to pre-process the tactile sensor data 212 into a suitable format, filter the tactile sensor data 212 when applicable, and determine the set of tactile sensor data 212 to be used as poses 232. The poses 232 are compared with detailed pre-derived object data about the object 210 which initially is the set of all of the possible candidate poses 222 for the object 210. Example candidate poses 222 are illustrated in FIG. 2 as a plurality of individual black dots on a bottle. Based on the similarity to the poses 232, a subset of matching candidate poses 222 is selected for processing. The processing network 230 further includes a processing algorithm 236 configured to determine which of the candidate poses 222 to associate with each of the poses 232. An output, such as output module 128 of FIG. 1, provides taxel hyper-resolution data 242 suitable for a downstream system 240.

Figure 5:
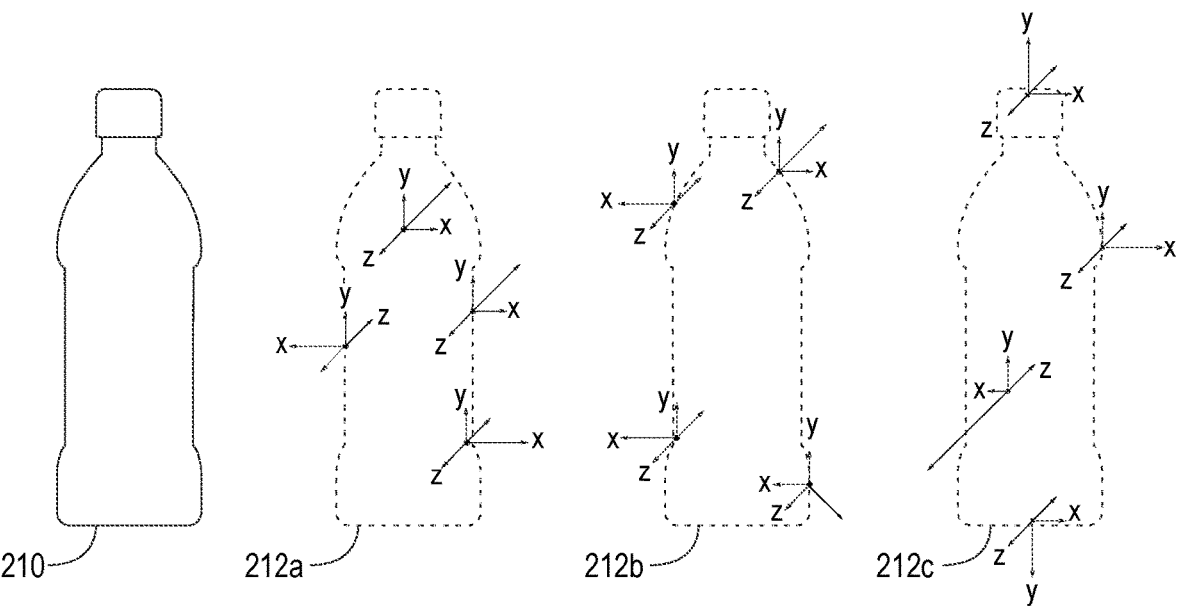
FIG. 5 includes exemplary image results for generating hyper-resolution geometric output data of an object from low resolution taxel data, according to one aspect.
Figure 5:
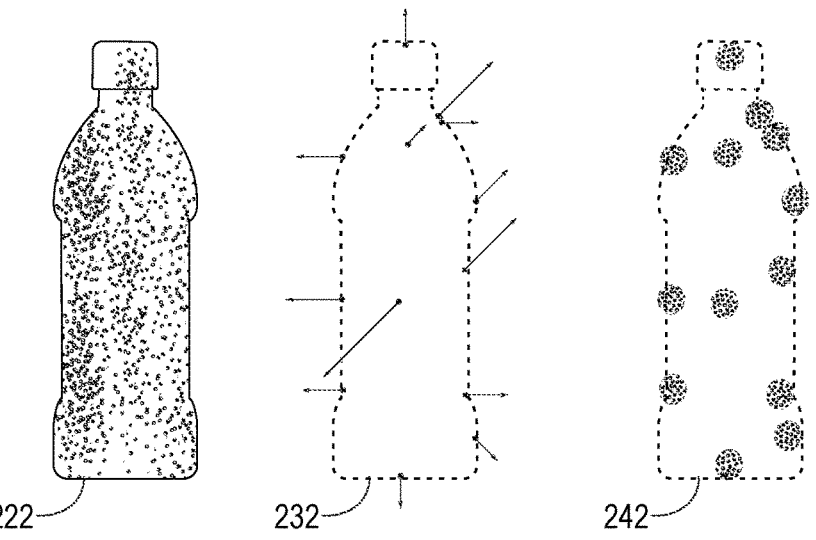

Referring also to FIG. 5, the example object 210, tactile sensor data 212a, 212b, and 212c, candidate poses 222, poses 232, and taxel hyper-resolution data 242 are presented in greater detail.

Referring to the pre-processing algorithm 234, the raw tactile sensor data 212 may be initially converted into a suitable format. The tactile sensor data 212 may be compared with pre-derived object data about the object 210, such as the candidate poses 222, from a suitable data store 220 and filtered to generate a set of candidate poses 222 to be matched with poses 232. In embodiments, the filtering is optional such that all of the poses 232 may be included. A larger or smaller number of candidate poses 222 may similarly be selected. The candidate poses 222 may be received from a suitable data store 220, for example internal memory or a network database as illustrated. The selected candidate poses 222 along with the poses 232 may be stored in a suitable graph.

Referring to the processing algorithm 236, the candidate poses 222 are compared to the poses 232 to determine the most likely candidate pose 222 for each of the poses 232. For example, poses 232 from multiple contact locations on the surface of the object 210 may be iteratively compared with known surface contacts stored in the pre-derived object data as candidate poses 222. In this way, a joint probability distribution of surface contacts with the object 210 may be estimated from the candidate poses 222 and poses 232.

After determining the associated candidate poses 222 for each of the poses 232, the processing algorithm 236 generates taxel hyper-resolution data 242 associated with the determined candidate poses 222. The taxel hyper-resolution data 242 may be output to a downstream system 240 in a format suitable for the downstream system 240.

Example methods of the pre-processing algorithm 234 and processing algorithm 236 are presented below with respect to FIG. 3 and FIG. 4 and the associated detailed description.

II. Methods for Taxel Hyper-Resolution Through Multi-Contact Localization

Figure 3:
FIG. 3 is an exemplary agent environment of a system for generating hyper-resolution geometric output data of an object from low resolution taxel data, according to one aspect.
Figure 3:
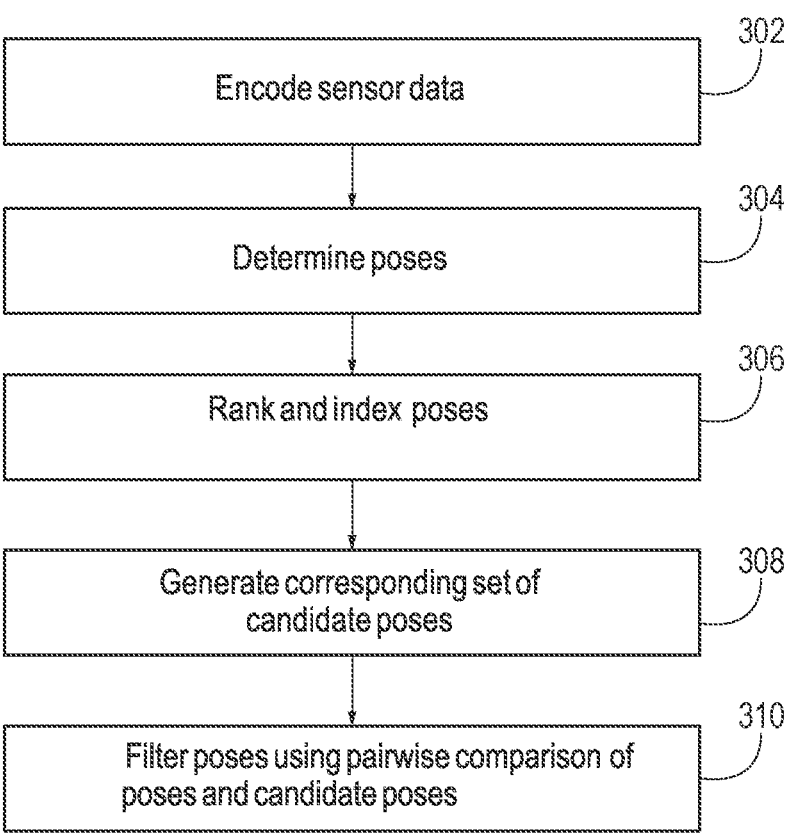

Referring now also to FIG. 3, a method 300 for generating poses will now be described according to an exemplary embodiment. FIG. 3 will also be described with reference to FIGS. 1, 2, and 4-7. For simplicity, the method 300 will be described as a sequence of elements, but it is understood that the elements of the method 300 may be organized into different architectures, blocks, stages, and/or processes, for example as described for the pre-processing algorithm 234 and processing algorithm 236 of FIG. 2.

At block 302, the method 300 includes an encoding operation. At each instance, i, when a sensor 206 contacts the object 210, the sensor 206 generates tactile sensor data 212 in a raw format based on the measurement(s) available from the particular sensor: $S_i$. At block 302 tactile sensor data 212 is encoded into a suitable taxel format by an encoder:

$$T_i \leftarrow Enc_t(S_i) \tag{1}$$

where T is the set of encoded taxel data and $T_i$ is the taxel latent code, or encoded taxel data, for a particular encoded value. The encoder may be a neural network or any other suitable encoder.

At block 304, a similarity determination:

$$P_i \leftarrow (T_i \cdot S) \tag{2}$$

is performed to determine a pose $P_i$ for each encoded taxel data $T_i$. The set of surface encodings S and surface latent code $S_i$ may be similarly generated using a surface encoder $Enc_{t( \ )}$ and stored as pre-derived object data or candidate poses 222. The set of surface codings is generally much larger than the set of taxel data:

$$S \gg T \tag{3}$$

for example by a factor of 100 or more, so that many surface latent code $S_i$ may be similar to each taxel latent code $T_i$. Therefore each pose $P_i$ may include a distribution of surface latent code $S_i$ based on the determined similarity to the taxel latent code $T_i$. In an embodiment, the pose $P_i$ for each encoded taxel data $T_i$ may be determined by first taking the dot product of the encoded tactile force with respect to the surface S. In this way, only the amount of the force measured by the taxel sensor 206 that is normal to the surface S of the object 210 is used in the similarity determination. This is advantageous because a taxel sensor 206 that is pressing directly onto the object 210 generally provides a sufficiently precise measurement. When a taxel sensor 206 presses onto the object 210 at an angle, a sufficiently precise measurement may not be sensed due of the angle of incidence.

At block 306, the matching surface latent code $S_i$ associated with the pose $P_i$ are sorted:

$$Idx_i \leftarrow \text{Arg Sort}(P_i)[:N] \qquad (4)$$

to generate an index Idx of the top N candidates based on the determined similarity. In various embodiments, the number of selected candidates N may be based on elements that meet a threshold value, on a percentage of elements, on a minimum number of elements, or any other suitable criteria required to satisfy the requisite number of elements for proper operation of the algorithms described herein. The set of poses P is generated based on the index such that each pose $P_i$ includes the top N candidates:

$$P_i \leftarrow P_i[Idx_i]. \qquad (5)$$

At block 308, a corresponding set of candidate poses C are received from pre-derived object data from a data store 220. The set of candidate poses C are selected based on the index Idx so that each matching surface latent code $S_i$ in a pose $P_i$ is present in the corresponding set of candidate poses:

$$C_i \leftarrow C_i[Idx_i] \qquad (6)$$

At block 310, the sets of poses P and candidate poses C are filtered by a pairwise comparison of the poses P with the candidate poses C. In an example embodiment, each pose $P_i$ is first iteratively paired with another pose $P_j$ such that after all iterations are completed each pose has been paired with every other pose:

$$(i, j) \in \text{any combinations of two in } P. \qquad (7)$$

Similarly, each candidate pose $C_i$ is then iteratively paired with another candidate pose $C_j$. For each pair of poses $P_i, P_j$ the observed distance:

$$d_{obs} = Dist(P_i, P_j) \qquad (8)$$

is determined. Similarly for each pair of candidate poses $C_i, C_j$ the distance $$d_{cand} = Dist(C_i, C_j) \qquad (9)$$

is determined.

A second index $Idx_i$, $Idx_j$ is generated by determining, for each pair of poses $P_i, P_j$, if there is a corresponding pair of candidate poses $C_i$, $C_j$ that have the identical distance between pairs of candidate poses $d_{cond}$ as the poses $d_{obs}$ or are within a threshold value such as:

$$|d_{obs} - d_{cand}| < 0.01. \qquad (10)$$

For example, in an embodiment the threshold value is within 0.01 the second index is generated using the following rule:

$$Idx_i, Idx_j = Arg\text{Where}(|d_{obs} - d_{cand}| < 0.01). \qquad (11)$$

Other suitable threshold values, such as normalized distances or values, percentages, and so forth, may be similarly used. The threshold may be used to offset error and noise, such as forward kinematics. In an embodiment, the threshold may be optional if sufficient computational resources are available. Based on the second index, suitable poses are generated:

$$P_i \leftarrow P_i[Idx_i], P_j \leftarrow P_j[Idx_j] \qquad (12)$$

and corresponding candidate poses are generated:

$$C_i \leftarrow C_i[Idx_i], C_j \leftarrow C_j[Idx_j] \qquad (13)$$

based on the second index, while poses and candidate poses that do not meet the criteria are excluded and filtered from the sets P,C.

Figure 4:
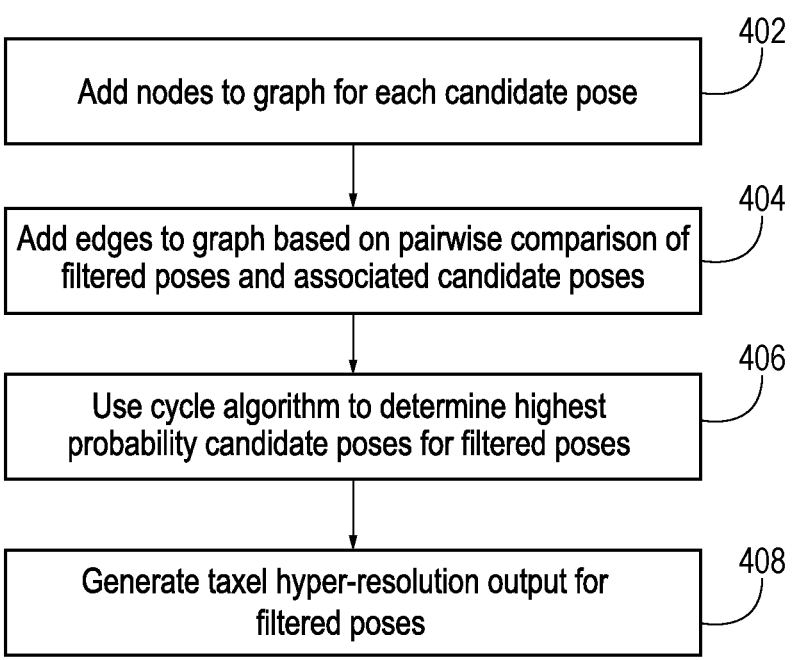
FIG. 4 is an exemplary process flow of a method for generating hyper-resolution geometric output data of an object from low resolution taxel data, according to one aspect.

Referring now also to FIG. 4, a method 400 for determining the pose of the object will now be described according to an exemplary embodiment. FIG. 4 will also be described with reference to FIGS. 1-3, and 5-7. For simplicity, the method 400 will be described as a sequence of elements, but it is understood that the elements of the method 400 may be organized into different architectures, blocks, stages, and/or processes.

At block 402, the method 400 includes a graph operation. Starting with an initially empty, undirected multipartite graph g, nodes are added to the graph g that correspond to each pair of the remaining filtered candidate poses C from block 310 of method 300 in FIG. 3. Each candidate pose $C_i$ is iteratively paired with another pose $C_j$, and a node:

$$g \cdot \text{AddNode}(C_{i,j}, \text{weight} = P_{i,j}) \qquad (14)$$

is generated in the graph for each pair CG of filtered candidate poses C where the weight is derived from the corresponding filtered pose $P_{ij}$ from block 310.

At block 404, edges are added to the graph g by performing a pairwise comparison of the candidate poses C with the poses P similar to the operations described in block 310. Each candidate pose $C_i$ is iteratively paired with another candidate pose $C_j$ to generated the set of filtered candidate poses:

$$(i, j) \in \text{any combinations of two in } C. \tag{15}$$

For each pair of candidate poses $C_i$, $C_j$ the distance:

$$d_{cand} = Dist(C_i, C_j) \tag{16}$$

is determined and compared to the observed distance:

$$d_{obs} = Dist(P_i, P_j) \tag{17}$$

of poses $P_i$, $P_j$. A third index $Idx_i$, $Idx_j$ is generated by determining, for each pair of candidate poses $C_i$, $C_j$, if there is a corresponding pair of poses $P_i$, $P_j$ that have identical distances or are within a threshold value, for example:

$$|d_{obs} - d_{cand}| < 0.01 \tag{18}$$

and a corresponding edge $$g \cdot AddEdge(Idx_i, Idx_j) \tag{19}$$

is added to the graph g when the threshold requirement is met.

At block 406, a cycle finding algorithm iteratively cycles through the graph g to find the cycle with the highest combined probability. Once the cycle with the highest combined probability is determined, each tactile sensor is assigned the most likely pose from the associated candidate poses C. In an embodiment, the taxel hyper-resolution output may be generated from the associated candidate poses C.

At block 408, a geometric representation of each area of contact on the object 210 with a sensor 206 may be generated based at least in part on the determined pose of each tactile sensor 206 from block 406 and a model M of the object 210. Each pose may represent the relative position of the sensor 206 with respect to the object 210 and the area of contact the object 210. A geometric representation may be any suitable mapping of the pose to a desired form, for example a cubic space representing the area in front of the sensor. In this embodiment, the intersection of the cubic space of an associated sensor 206 with the model M of the object 210 may represent the hyper-resolution space of the respective sensor 206. In various embodiments, the geometric representation, or the model M, may be represented as a mesh, point cloud, signed distance field, or any other suitable representation. In an embodiment, a taxel hyper-resolution output based on the geometric representation is generated and sent to a downstream process or system. In other embodiments, the likely position and orientation of an object may be generated based at least in part on the poses, and a desired output and format may be generated based at least in part on the determined position and orientation of the object.

Figure 6:
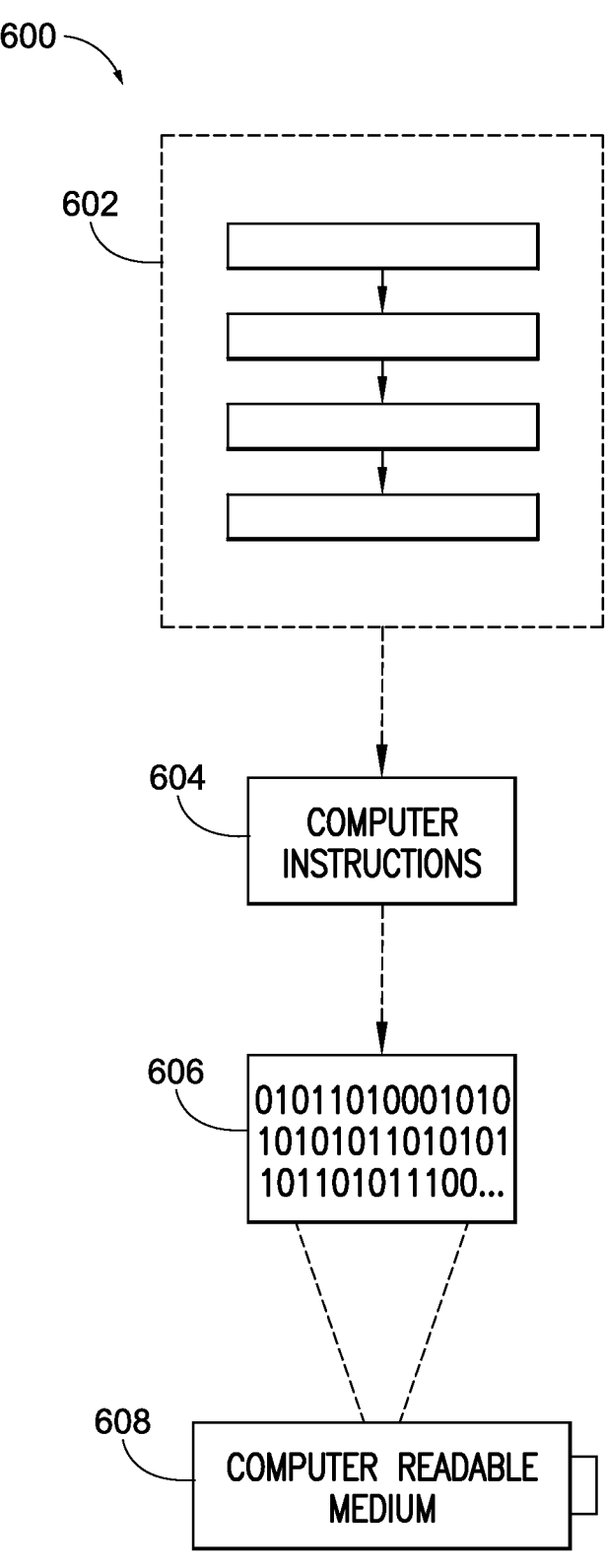
FIG. 6 is an illustration of an example computer-readable medium or computer-readable device including processor-executable instructions configured to embody one or more of the provisions set forth herein, according to one aspect.

Referring now also to FIG. 6, in another aspect a computer-readable medium including processor-executable instructions configured to implement one aspect of the techniques presented herein. An aspect of a computer-readable medium or a computer-readable device devised in these ways is illustrated wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 and/or the method 400 of FIG. 4. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
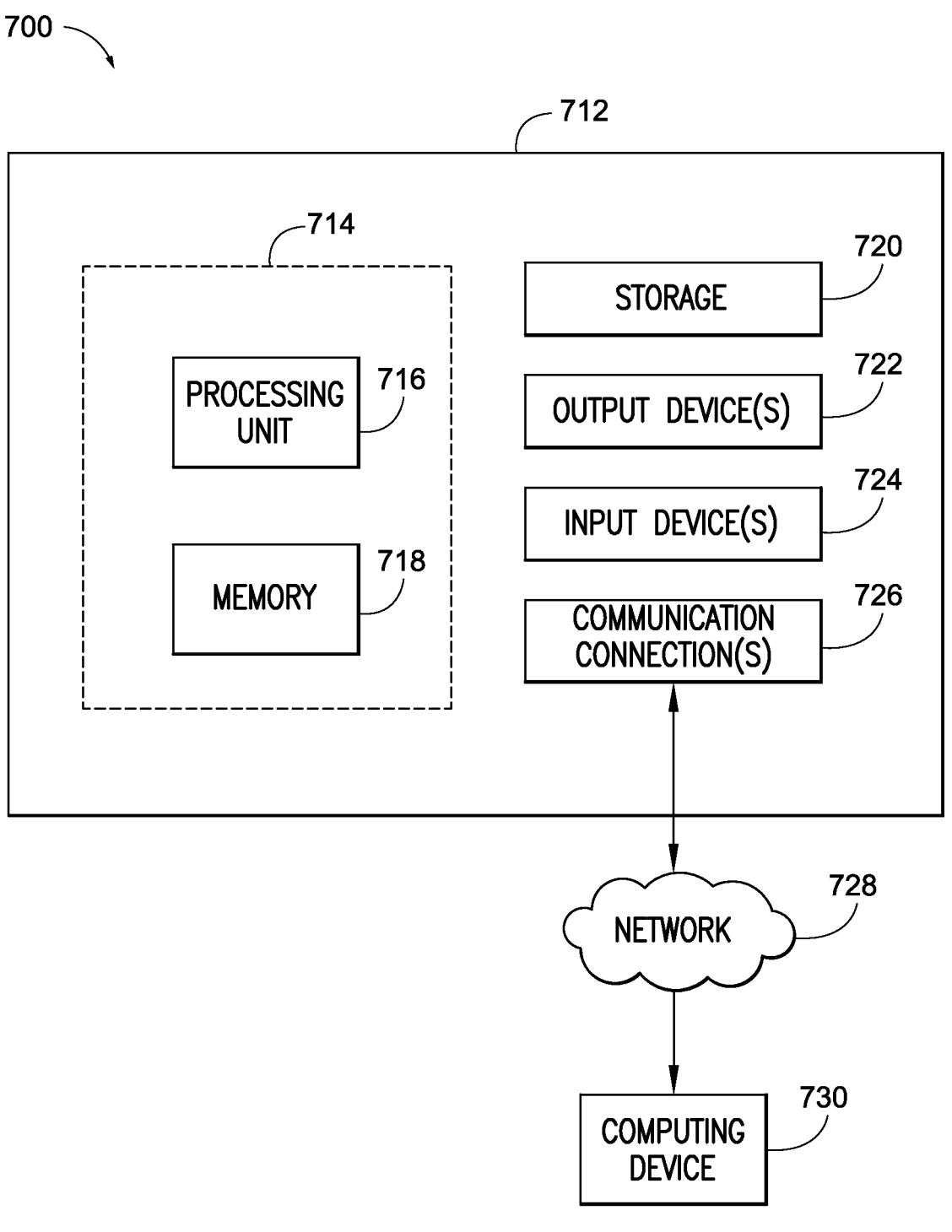
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, embedded processors or controllers, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712. The apparatus 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for taxel hyper-resolution output, comprising:
a memory storing instructions when executed by a processor cause the processor to:
encode, via a first processing module, taxel data associated with a plurality of physical contacts with an object by one or more tactile sensors,
compare the encoded taxel data with detailed object data,
generate a set of poses from the encoded taxel data based at least in part on the compare operation, and
determine one or more candidate poses from the detailed object data for each pose in the set of poses;
perform, via a second processing module, iterative pairwise comparisons of pairs of poses from the set of poses with pairs of candidate poses, and
determine, for each pose, a substantially matching candidate pose from the candidate poses based at least in part on the iterative pairwise comparisons; and
generate, via an output module, taxel hyper-resolution data for a determined pose.

2. The system of claim 1, wherein first processing module is further configured to:
rank the poses, and select a subset of the poses as the set of poses based on the rank.

3. The system of claim 1, wherein the first processing module is further configured to:

store the candidate poses and poses in a graph, wherein each node in the graph represents a candidate pose and the associated pose.

4. The system of claim 3, wherein the graph includes an edge for each pair of candidate poses that substantially matches a corresponding pair of poses.

5. The system of claim 4, wherein the second processing module further comprises:

a cycling algorithm configured to iteratively process the nodes and edges in the graph to determine a set of candidate poses with the highest probable match with the set of poses.

6. The system of claim 5, wherein the taxel hyper-resolution data is generated for each determined pose in the set of candidate poses.

7. The system of claim 6, wherein the format of the taxel hyper-resolution data is selected from the group consisting of a plurality of taxels, a mapping of each determined pose into plurality of taxels positioned within a cubic space associated with a tactile sensor, a mesh representing a plurality of taxels, a point cloud representing a plurality of taxels, and a signed distance field associated with a plurality of taxels, and wherein the generated taxel-based output data has a spatial resolution greater than the taxel-based data from the tactile sensors.

8. A method for taxel hyper-resolution output, comprising:

receiving a plurality of taxel-based data associated with a plurality of contacts with an object by one or more tactile sensors;

comparing the received taxel-based data with detailed object data;

generating a set of poses from the plurality of taxel-based data;

generating a plurality of candidate poses from the detailed object data based on the comparing the received taxel-based data with the detailed object data;

performing iterative pairwise comparisons of pairs of poses with pairs of candidate poses;

determining, for each pose, a substantially matching candidate pose from the plurality of candidate poses based at least in part on the iterative pairwise comparisons; and outputting taxel-based hyper-resolution data for a determined pose.

9. The method of claim 8, wherein generating the set of poses further comprises:

determining a ranking of the taxel-based data based on the comparing of the received taxel-based data with detailed object data; and selecting a subset of the taxel-based data for the poses based on the ranking.

10. The method of claim 9, wherein the set of poses is generated from the subset of the taxel-based data.

11. The method of claim 8, further comprising:

generating a multipartite graph;

adding nodes to the multipartite graph for each of the plurality of candidate poses for an associated pose.

12. The method of claim 11, further comprising:

adding edges to the multipartite graph for each substantially matching pair of candidate poses determined from the iterative pairwise comparisons of pairs of poses with pairs of candidate poses.

13. The method of claim 12, wherein determining the corresponding candidate pose from the plurality of candidate poses further comprises:

performing a cycling algorithm to the multipartite graph to iteratively select a set of candidate poses to compare with each of the poses;

determining, for each cycle of the cycling algorithm, a probability determination of the selected set of candidate poses matching the poses; and selecting the set of corresponding candidate poses associated with each of the poses based on the highest determined probability from the cycling algorithm.

14. The method of claim 8, wherein outputting taxel-based hyper-resolution output further comprises:

retrieving detailed object data based corresponding to the determined pose; and generating taxel-based output data the retrieved detailed object data, wherein the taxel-based output data is selected from the group consisting of a plurality of taxels, a mapping of the candidate pose into plurality of taxels positioned within a cubic space associated with a tactile sensor, a mesh representing a plurality of taxels, a point cloud representing a plurality of taxels, and a signed distance field associated with a plurality of taxels, and wherein the generated taxel-based output data has a spatial resolution greater than the taxel-based data from the tactile sensors.

15. A non-transitory computer readable storage medium storing instructions that when executed by a computer having a processor perform operations for taxel hyper-resolution output, comprising operations to:

receive taxel data associated with a tactile sensor in contact with an object;

compare taxel data with detailed object data;

generate a set of poses from the taxel data;

generate candidate poses from the detailed object data based at least in part on comparing the taxel data associated with the set of poses with the detailed object data;

determine substantially matching candidate poses by performing iterative pairwise comparisons of pairs of poses with pairs of candidate poses; and output taxel hyper-resolution data for determined poses.

16. The non-transitory computer readable storage medium of claim 15, wherein the generating the set of poses further comprises operations to:

rank the poses based on the comparing of the taxel data with the detailed object data; and select a subset of the poses based on the ranking of the poses.

17. The non-transitory computer readable storage medium of claim 15, further comprising operations to:

generate a multipartite graph; and add nodes to the multipartite graph for each of each of the generated candidate poses for an associated pose from the set of poses.

18. The non-transitory computer readable storage medium of claim 17, further comprising operations to:

add an edge to the multipartite graph for each substantially matching pair of candidate poses.

19. The non-transitory computer readable storage medium of claim 18, wherein determining the determined candidate pose from the plurality of candidate poses further comprises operations to:

perform a cycling algorithm to the multipartite graph to iteratively select and compare sets of candidate poses with associated poses;

determine, for each cycle of the cycling algorithm, a probability determination for each selected set of candidate poses; and select a set of determined poses from the sets of candidate poses based on the highest determined probability from the cycling algorithm.

20. The non-transitory computer readable storage medium of claim 15, wherein outputting taxel hyper-resolution output further comprises operations to:

retrieve detailed object data based corresponding to the determined pose; and generate taxel output data the retrieved detailed object data, wherein the taxel output data format is selected from the group consisting of a plurality of taxels, a mapping of the candidate pose into a plurality of taxels positioned within a cubic space associated with a tactile sensor, a mesh representing a plurality of taxels, a point cloud representing a plurality of taxels, and a signed distance field associated with a plurality of taxels, and wherein the generated taxel output data has a spatial resolution greater than the taxel data from the tactile sensors.

* * * * *